United States Patent [19]

Jaaskelainen, Jr. et al.

[11] Patent Number: 6,115,029
[45] Date of Patent: *Sep. 5, 2000

[54] GRAPHICAL POINTING DEVICE AND METHOD FOR CONTROLLING A GRAPHICAL POINTER WITHIN A DATA PROCESSING SYSTEM

[75] Inventors: William Jaaskelainen, Jr., Austin, Tex.; Leon E. Gregg, Rochester, Minn.

[73] Assignee: International Business Machines Corporation, Armonk, N.Y.

[*] Notice: This patent is subject to a terminal disclaimer.

[21] Appl. No.: 08/581,856

[22] Filed: Jan. 2, 1996

[51] Int. Cl.$^7$ ........................................... G09G 5/08
[52] U.S. Cl. ................................. 345/159; 345/163
[58] Field of Search ...................... 345/157–165

[56] References Cited

U.S. PATENT DOCUMENTS

| | | | |
|---|---|---|---|
| 4,552,360 | 11/1985 | Bromley et al. | 273/856 |
| 4,868,549 | 9/1989 | Affinito et al. | 345/163 |
| 4,952,081 | 8/1990 | Hedtke | 388/825 |
| 5,153,571 | 10/1992 | Takahashi | 345/159 |
| 5,195,179 | 3/1993 | Tokunaga | 345/159 |
| 5,309,172 | 5/1994 | Fox | 345/159 |
| 5,432,530 | 7/1995 | Arita et al. | 345/159 |
| 5,508,717 | 4/1996 | Miller | 345/145 |
| 5,570,111 | 10/1996 | Barrett et al. | 345/159 |
| 5,771,038 | 6/1998 | Wang | 345/163 |

FOREIGN PATENT DOCUMENTS

| | | | |
|---|---|---|---|
| 60-179821 | 9/1985 | Japan | G06F 3/03 |
| 62-75830 | 4/1987 | Japan | G06F 3/033 |
| 63-318624 | 12/1988 | Japan | G06F 3/033 |
| 1-129319 | 5/1989 | Japan | G06F 3/033 |
| 1-267721 | 10/1989 | Japan | G06F 3/033 |

*Primary Examiner*—Bipin Shalwala
*Assistant Examiner*—David L. Lewis
*Attorney, Agent, or Firm*—Mark S. Walker; Brian F. Russell; Andrew J. Dillon

[57] ABSTRACT

A graphical pointing device and method for controlling a graphical pointer displayed within a display device of a data processing system are disclosed. The graphical pointing device includes a transducer, which converts manipulation of the graphical pointing device into electrical signals utilized by a data processing system to move a graphical pointer displayed within a display device. In addition, the graphical pointing device includes a graphical pointer speed control for varying a relationship between the electrical signals and manipulation of the graphical pointing device, thereby enabling the graphical pointer to be moved within the display device at various speeds by differing adjustments of the graphical pointer speed control without modifying programming within the data processing system.

8 Claims, 7 Drawing Sheets

GRAPHICAL POINTING DEVICE AND METHOD FOR CONTROLLING A GRAPHICAL POINTER WITHIN A DATA PROCESSING SYSTEM

BACKGROUND OF THE INVENTION

1. Technical Field

The present invention relates in general to an input device for a data processing system and in particular to a graphical pointing device and method for controlling a graphical pointer displayed within a display device of a data processing system. Still more particularly, the present invention relates to a graphical pointing device and method for controlling a graphical pointer displayed within a display device of a data processing system which enable a user to vary the speed of movement of the graphical pointer without modifying programming within the data processing system.

2. Description of the Related Art

Within data processing systems, user interface is accomplished in a variety of ways. An increasingly common type of user interface is a graphical user interface (GUI), which provides a user with a graphical and intuitive display of information. A conventional GUI display includes a "desktop" or background upon which one or more icons, application windows, or other graphical objects are displayed. Typically, a data processing system user interacts with a GUI display utilizing a graphical pointer, which the user controls with a graphical pointing device, such as a mouse, trackball, or joystick. For example, depending upon the actions allowed by the active application or operating system software, the user can select icons or other graphical objects within the GUI display by positioning the graphical pointer over the graphical object and depressing a button associated with the graphical pointing device. In addition, the user can typically relocate icons, application windows, and other graphical objects on the desktop utilizing the well-known drag-and-drop technique.

Conventionally, the movement of the graphical pointer within the GUI display has a fixed relationship to the manipulation of the graphical pointing device over all portions of the GUI display. For example, if the user moves the graphical pointing device two units to the right, the graphical pointer responds by moving two scaled units to the right within the GUI display. However, to accommodate the preferences of a variety of users, many operating systems provide facilities which enable either an application or the user or both to set the tracking speed of the graphical pointer in relationship to the manipulation of the graphical pointing device. For example, some users prefer to set the tracking speed of the graphical pointer to a relatively high setting in order to limit the amount of manipulation required to traverse the GUI display. Alternatively, some users prefer a relatively low setting to facilitate selection of small graphical objects and other tasks which require precise manipulation of the graphical pointer.

Although the operating system software facilities that enable the user to vary the tracking speed of the graphical pointer enhance the flexibility of the GUI, such tracking speed control facilities are often inconvenient to use since the user must typically interrupt work on the current task, select an operating system icon to open a graphical pointer control window, adjust the tracking speed, and then close the graphical pointer control window in order to set the graphical pointer tracking speed. As should thus be apparent, it would be desirable to provide an improved method and system for controlling a graphical pointer within a GUI. In particular, it would be desirable to provide a graphical pointing device and method for controlling a graphical pointer which enable a user to adjust the tracking speed of the graphical pointer without modifying software settings within a data processing system.

SUMMARY OF THE INVENTION

It is therefore one object of the present invention to provide an improved input device for a data processing system.

It is another object of the present invention to provide an improved graphical pointing device and method for controlling a graphical pointer within a data processing system.

It is yet another object of the present invention to provide an improved graphical pointing device and method for controlling a graphical pointer within a data processing system which enable a user to adjust the tracking speed of the graphical pointer without modifying programming within the data processing system.

The foregoing objects are achieved as is now described. A graphical pointing device and method for controlling a graphical pointer displayed within a display device of a data processing system are disclosed. The graphical pointing device includes a transducer, which converts manipulation of the graphical pointing device into electrical signals utilized by a data processing system to move a graphical pointer displayed within a display device. In addition, the graphical pointing device includes a graphical pointer speed control for varying a relationship between the electrical signals and manipulation of the graphical pointing device, thereby enabling the graphical pointer to be moved within the display device at various speeds by differing adjustments of the graphical pointer speed control without modifying programming within the data processing system.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
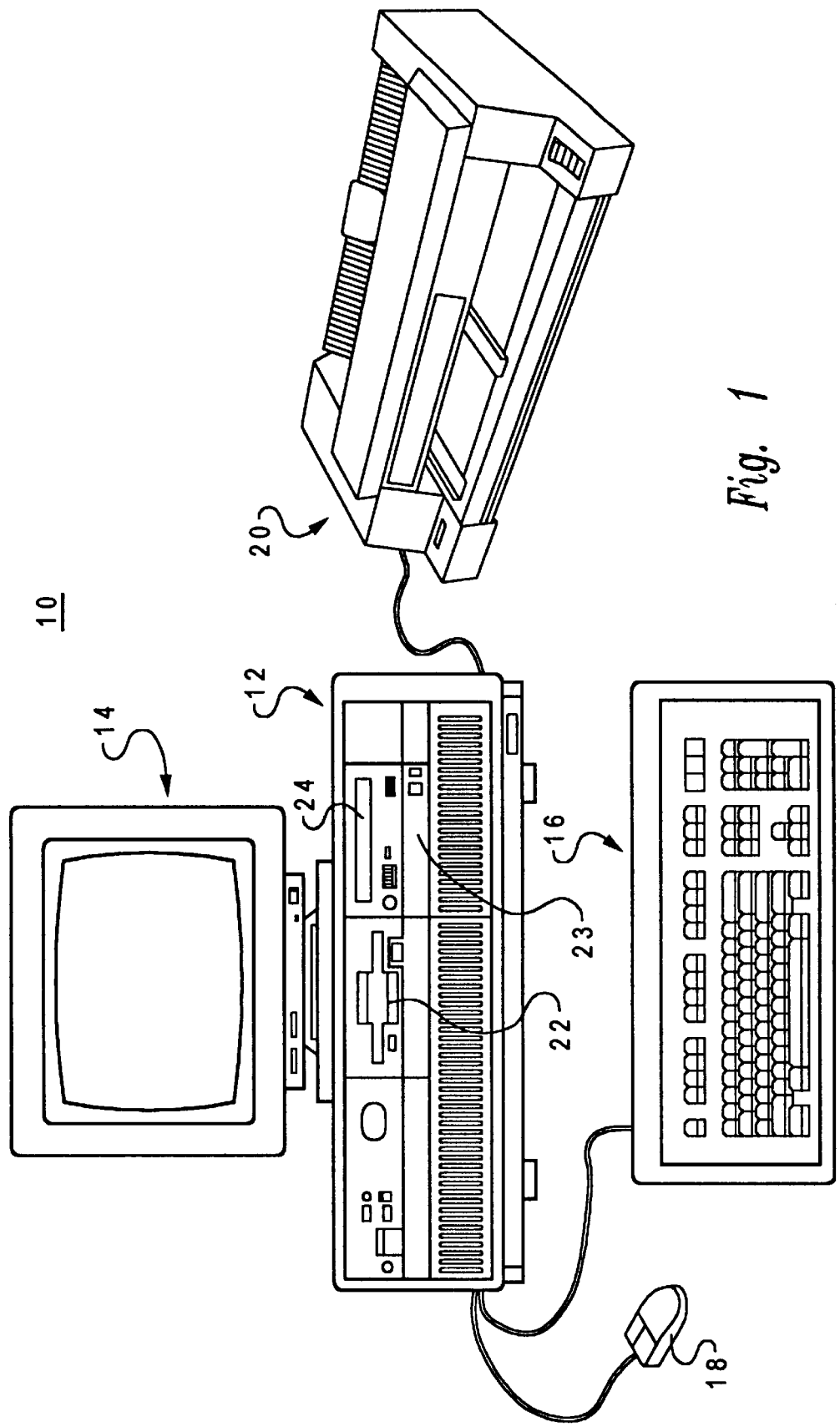
FIG. 1 is a pictorial representation of a data processing system which may be utilized to implement the method and system of the present invention.

With reference now to the figures and in particular with reference to FIG. 1, there is illustrated a preferred embodiment of a data processing system which may be utilized to implement the method of the present invention. As illustrated, data processing system 10 includes system unit 12, display device 14, keyboard 16, mouse 18, and printer 20. As is well-known in the art, system unit 12 receives data for processing from input devices such as keyboard 16, mouse 18, or local area networking interfaces (not illustrated). Mouse 18 is preferably utilized in conjunction with a graphical user interface (GUI) in which hardware and software system objects, including data processing system components and application programs, are controlled through the selection and manipulation of associated graphical objects displayed within display device 14. Although data processing system 10 is illustrated with mouse 18, those skilled in the art will recognize that other graphical pointing devices, including a joystick, puck, trackball, trackpad, and the IBM TrackPoint™ can also be utilized. Data processing system 10 presents output data to a user via display device 14 and printer 20. To support storage and retrieval of data, system unit 12 further includes diskette drive 22, hard disk drive 23, and CD-ROM drive 24, which are connected to system unit 12 in a well-known manner. Of course, those skilled in the art are aware that other conventional components can also be connected to system unit 12.

Figure 2:
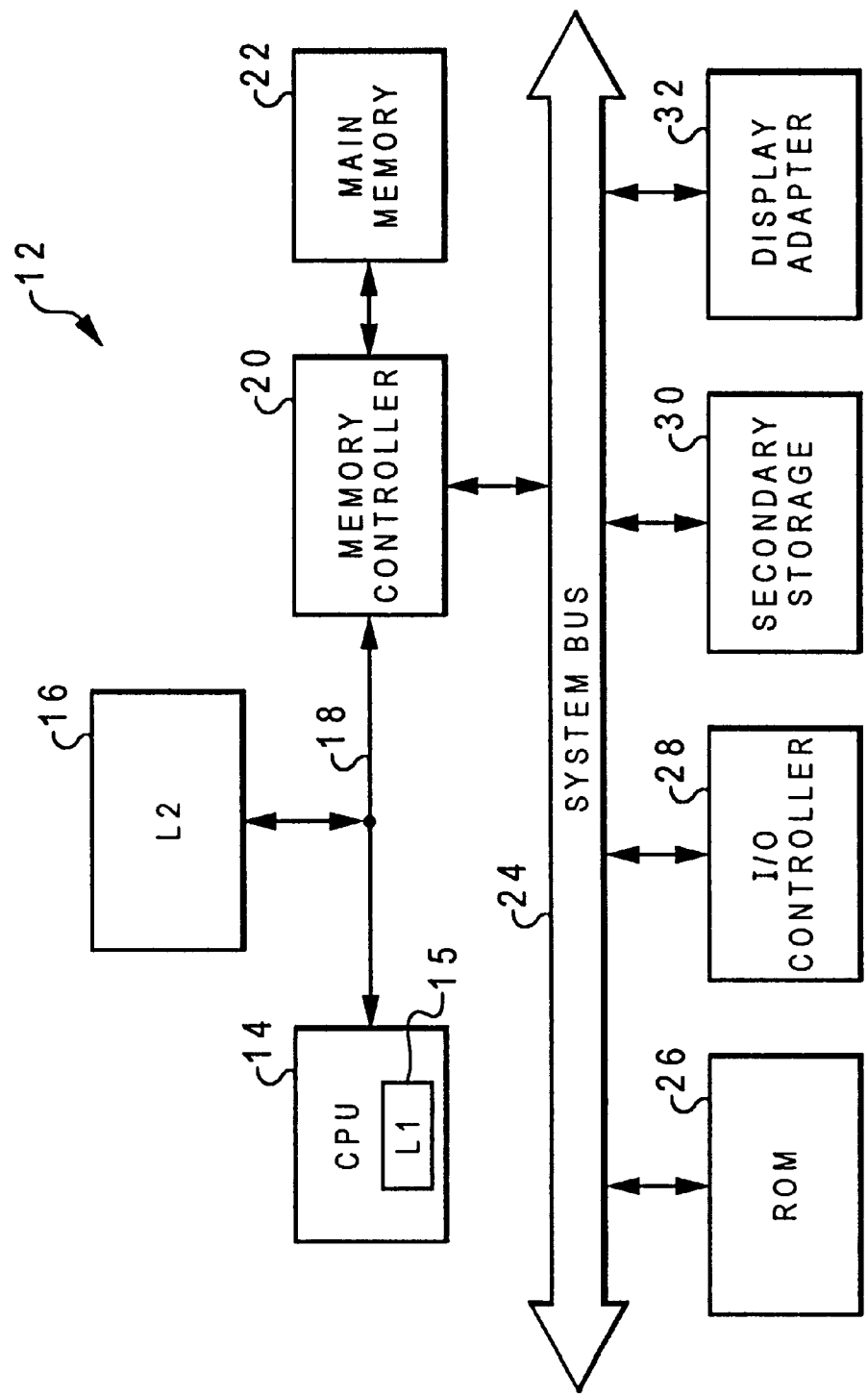
FIG. 2 depicts a block diagram of the system unit of the data processing system illustrated in FIG. 1.

Referring now to FIG. 2, there is depicted a block diagram of the principal components of system unit 12 of data processing system 10. As will be appreciated by those skilled in the art, many of the details of system unit 12 that are not relevant to the present invention have been omitted for the purpose of clarity. As illustrated, system unit 12 includes a central processing unit (CPU) 14 which executes software instructions. While any appropriate microprocessor can be utilized for CPU 14, CPU 14 is preferably one of the PowerPC™ line of microprocessors available from IBM Microelectronics. Alternatively, CPU 14 can be implemented as an Intel Pentium™ or an 80X86 microprocessor. To improve data and instruction access times, CPU 12 is equipped with an on-board level one (L1) cache 15 and an optional look-aside cache 16. CPU 14 is coupled to memory controller 20 by processor bus 18. Memory controller 20 provides a memory interface between CPU 12 and main memory 22 that fetches data and instructions from main memory 22 in response to receipt of read and write requests from CPU 12 that cannot be serviced by L1 cache 15 or L2 cache 16. In addition, memory controller 20 provides a system bus interface between system bus 24 and CPU 14 and main memory 22, which supports both memory mapped I/O and direct memory access (DMA).

As is further illustrated within FIG. 2, system unit 12 includes read only memory (ROM) 26, I/O controller 28, secondary storage 30, and display adapter 32, which are each coupled to system bus 24. As is common in conventional data processing systems, ROM 26 and secondary storage 30 (comprising diskette drive 22, hard disk drive 23, and CD-ROM drive 24) provide storage for operating system and application programs and data. Similarly, display adapter 32 provides a conventional interface between display device 14 and system unit 12. I/O controller 28 interfaces system unit 12 with keyboard 16 and a graphical pointing device such as mouse 18 to enable a user to input data and instructions. In response to receipt of an input, for example, a signal indicating that mouse 18 has been moved or that a key within keyboard 16 has been depressed, I/O controller 28 translates the input into a software-readable format and transmits an interrupt request to CPU 14. Thereafter, the input is typically read and processed by operating system or other software executed by CPU 14. In accordance with an important aspect of the present invention, the speed of a graphical pointer displayed within display device 14 is controlled not by software executed by CPU 14, but instead by hardware.

Figure 3A:
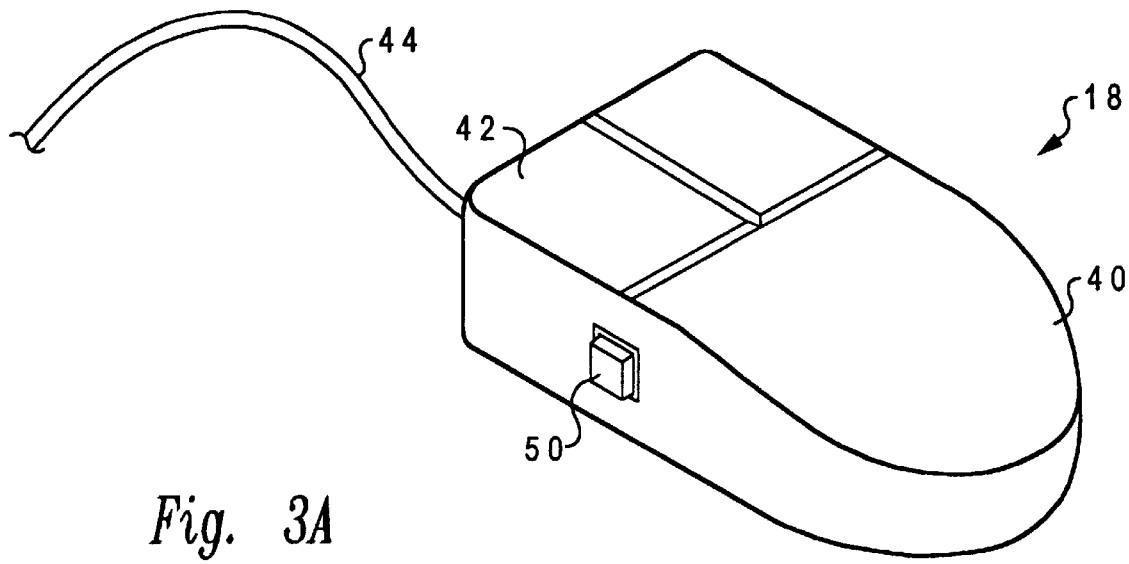
FIGS. 3A and 3B illustrate pictorial representations of a first preferred embodiment of a graphical pointing device in accordance with the present invention.
Figure 3B:
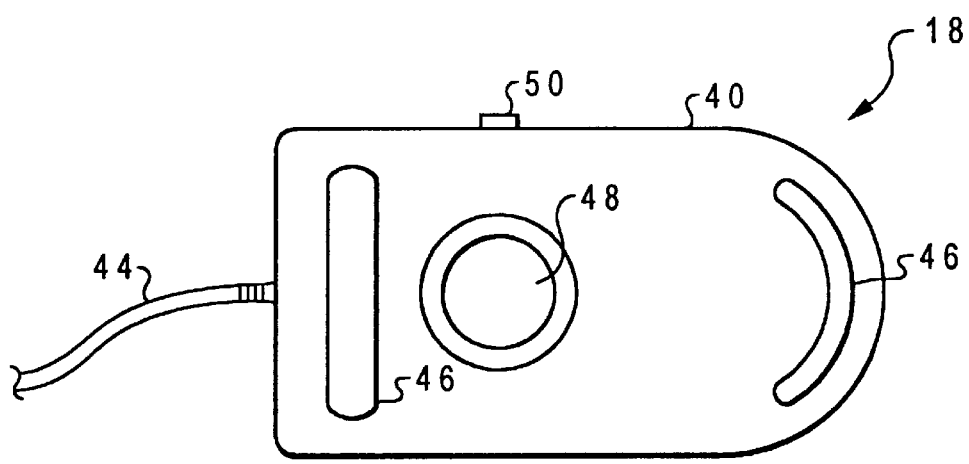

With reference now to FIGS. 3A and 3B, there are illustrated more detailed pictorial representations of a first preferred embodiment of a graphical pointing device in accordance with the present invention. Referring first to FIG. 3A, mouse 18 includes mouse body 40, two selection buttons 42 for selecting points within a GUI display, and cable 44 for transmitting electrical signals to system unit 12 of data processing system 10. Furthermore, as depicted within FIG. 3B, which illustrates the bottom surface of mouse body 40, mouse 18 rests upon low-friction pads 46 and ball 48. As is well-understood by those skilled in the art, the movement of mouse 18 across a surface is sensed from the rotation of ball 48 and converted into X and Y directional signals, which are transmitted to system unit 12 via cable 44.

Figure 4:
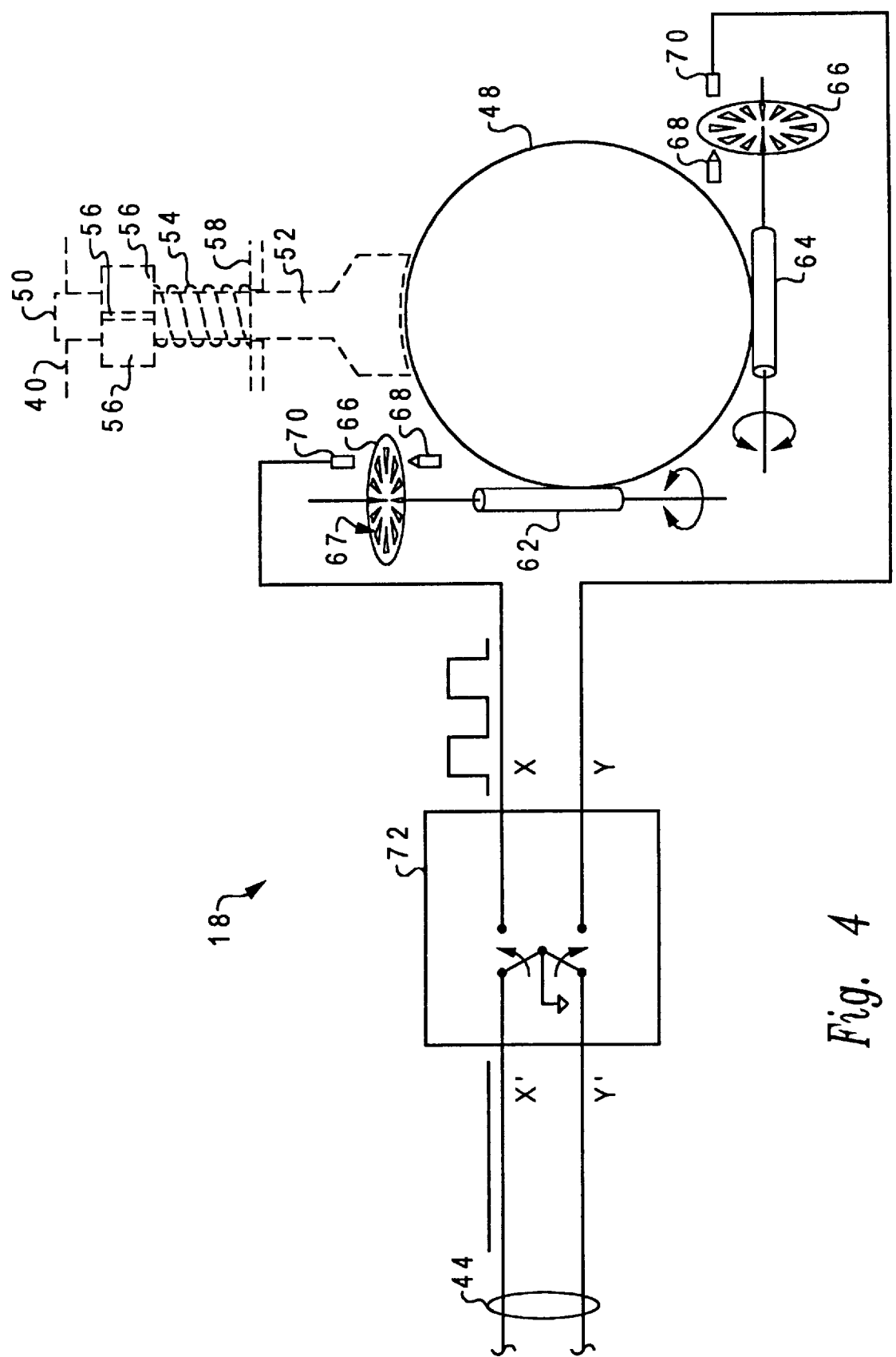
FIG. 4 depicts a more detailed pictorial representation of two alternative implementations of the first preferred embodiment of a graphical pointing device in accordance with the present invention.

In accordance with a first preferred embodiment of the present invention, mouse 18 further includes a two-position brake button 50 which is engaged to park the graphical pointer at a particular position within a GUI display. Referring now to FIG. 4, there is depicted a more detailed pictorial representation of mouse 18 illustrating two alternative implementations of brake button 50 within mouse 18. As illustrated, mouse 18 comprises an optomechanical mouse in which the rotation of ball 48 is translated into X and Y directional signals by a transducer comprising both optical and mechanical components. As ball 48 rotates, rollers 62 and 64 turn, causing rotating wheels 66 to also turn. Each of rotating wheels 66 is perforated by a number of slits 67 that permit light emitted by one or more light-emitting diodes (LEDs) 68 to pass through rotating wheel 66. Light passing through rotating wheel 66 is detected by one or more photosensors 70, resulting in squarewave X and Y directional signals. The number of squarewave pulses within the X and Y directional signals indicate the displacement of mouse 18 in each of the X and Y directions, while the frequency of the pulses indicates the velocity of mouse 18.

As is further illustrated within FIG. 4, in a first implementation of brake button 50, the X and Y directional signals are received as inputs to switch 72, which is controlled by the position of brake button 50. When brake button 50 is not engaged, switch 72 is closed and the X and Y directional signals are transmitted through cable 44 as X' and Y' directional signals, respectively. However, when brake button 50 is engaged, switch 72 opens and the X' and Y' directional signals transmitted via cable 44 are grounded. Thus, when brake button 50 is engaged, I/O controller 28 within system unit 12 does not receive X and Y directional signals in response to manipulation of mouse 18 and the graphical pointer displayed within display device 14 is "parked" at the location at which brake button 50 was engaged.

Alternatively, as indicated by dashed-line illustration, the graphical pointer displayed within display device 14 can be "parked" utilizing a second mechanical implementation of brake button 50 depicted within FIG. 4. As illustrated, in this implementation, engaging brake button 50 causes the end of shaft 52 to lodge against ball 48, thereby preventing ball 48 from rotating in response to manipulation of mouse 18. As shaft 52 is forced toward ball 48, spring 54 is compressed between wings 56 and sidewalls 58 until brake button 50 is substantially flush with mouse body 40. At that point, shaft 52 is locked in the engaged position by wings 56, which lock against protrusions (not illustrated) within mouse body 40. Thereafter, brake button 50 can be released by again depressing brake button 50, which returns brake button 50 to its original position under the urging of spring 54. Thus, in this implementation, brake button 52 preferably operates in the familiar push-to-engage, push-to-release manner, similar to a retractable ballpoint pen. As should thus be apparent, when brake button 50 is engaged, no X or Y directional signals are generated in response to manipulation of mouse 18 since ball 48 is fixed in a stationary position by shaft 52.

Figure 5A:
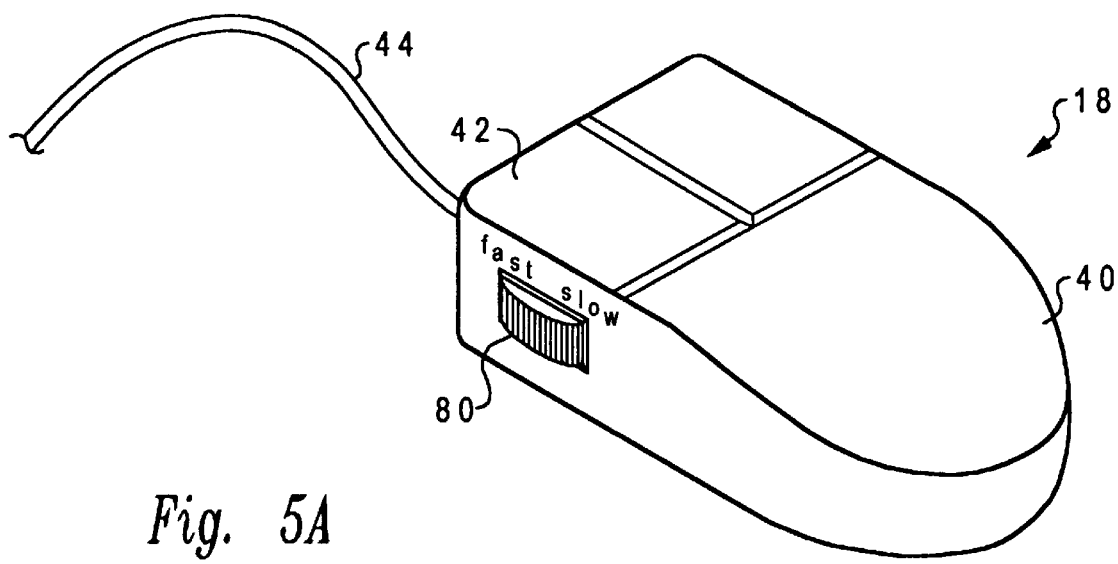
FIGS. 5A and 5B depict pictorial representations of a second preferred embodiment of a graphical pointing device in accordance with the present invention.
Figure 5B:
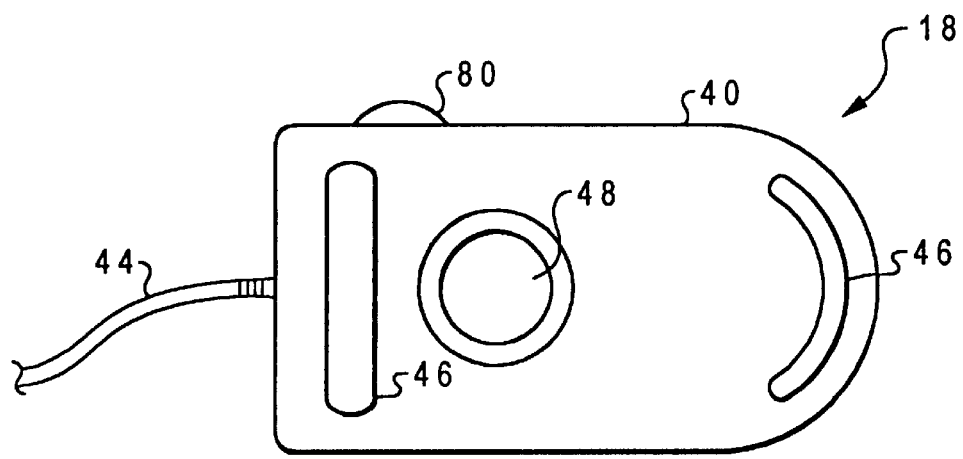

With reference now to FIGS. 5A and 5B, there are illustrated pictorial representations of a second preferred embodiment of mouse 18 in accordance with the present invention. As indicated by like reference numerals, the second preferred embodiment depicted in FIGS. 5A and 5B is similar to that illustrated within FIGS. 3A and 3B. However, instead of brake button 50, mouse 18 includes dial control 80, which enables a user to manually adjust the speed of movement of a graphical pointer displayed within display device 14.

Figure 6:
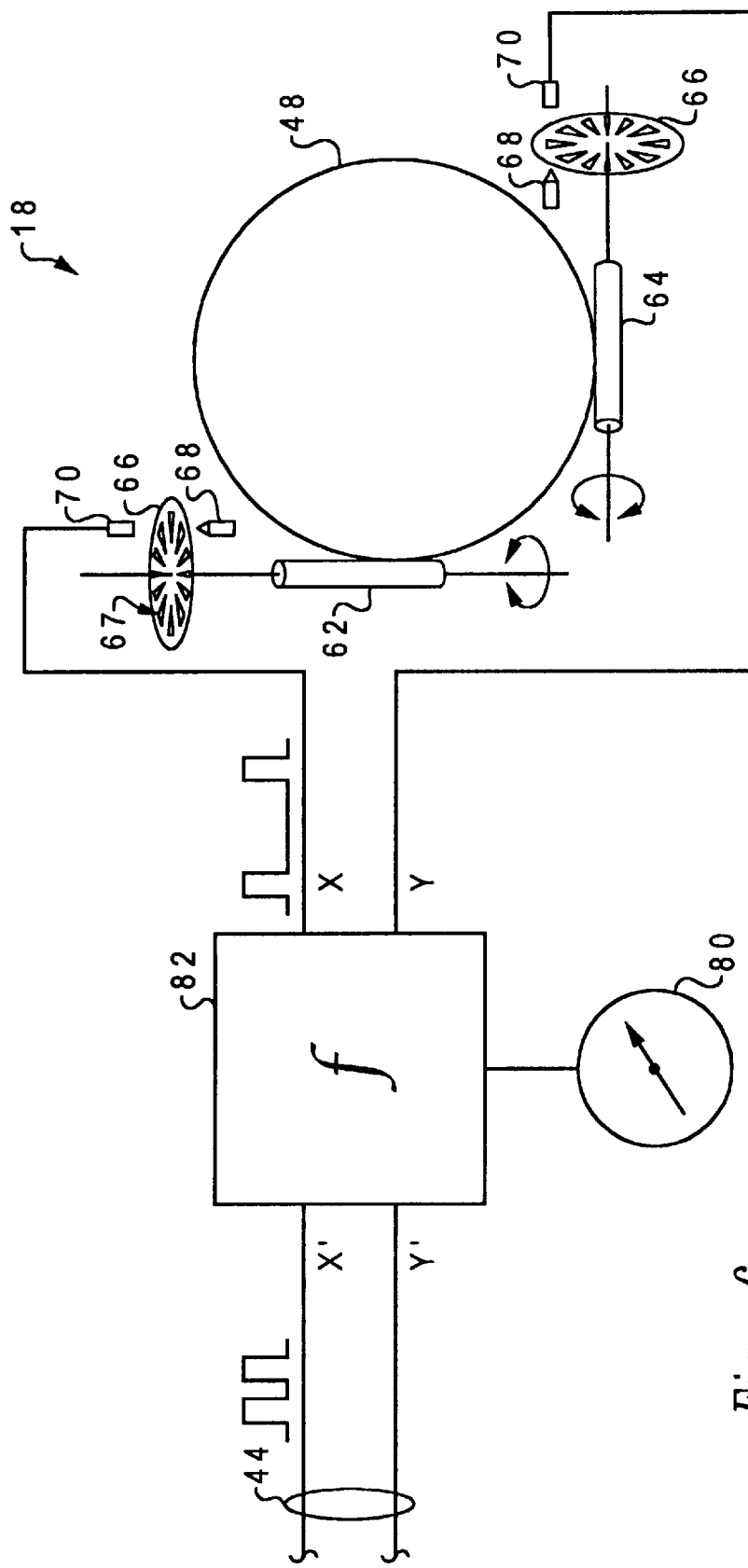
FIG. 6 depicts a more detailed pictorial representation of the second preferred embodiment of a graphical pointing device in accordance with the present invention.

Referring now to FIG. 6, there is depicted a more detailed diagram of the second preferred embodiment of the present invention. As indicated by like reference numerals, the embodiment illustrated within FIG. 6 comprises an optomechanical mouse like that illustrated within FIG. 4. However, instead of switch 72, the second preferred embodiment of mouse 18 depicted within FIG. 6 includes a variable frequency squarewave oscillator 82, which is controlled by the setting of dial control 80. Thus, as illustrated, if a fast setting is selected utilizing dial control 80, variable frequency squarewave oscillator 82 receives relatively low frequency squarewave X and Y directional signals and transmits relatively high frequency X' and Y' directional signals to I/O controller 28 via cable 44. Alternatively, if a slow setting of dial control 80 is selected, variable frequency squarewave oscillator 82 decreases the frequency of the output X' and Y' directional signals as compared with the frequency of the input X and Y directional signals. Thus, it should be apparent, a user can easily control the tracking speed of the graphical pointer within a GUI display simply by adjusting the setting of dial control 80 without adjusting graphical pointer settings maintained by operating system or other software executing within system unit 12. Those skilled in the art will appreciate that the second preferred embodiment of the present invention may alternatively be implemented utilizing a user-controlled variable mechanical resistance to the rotation of ball 48.

Figure 7:
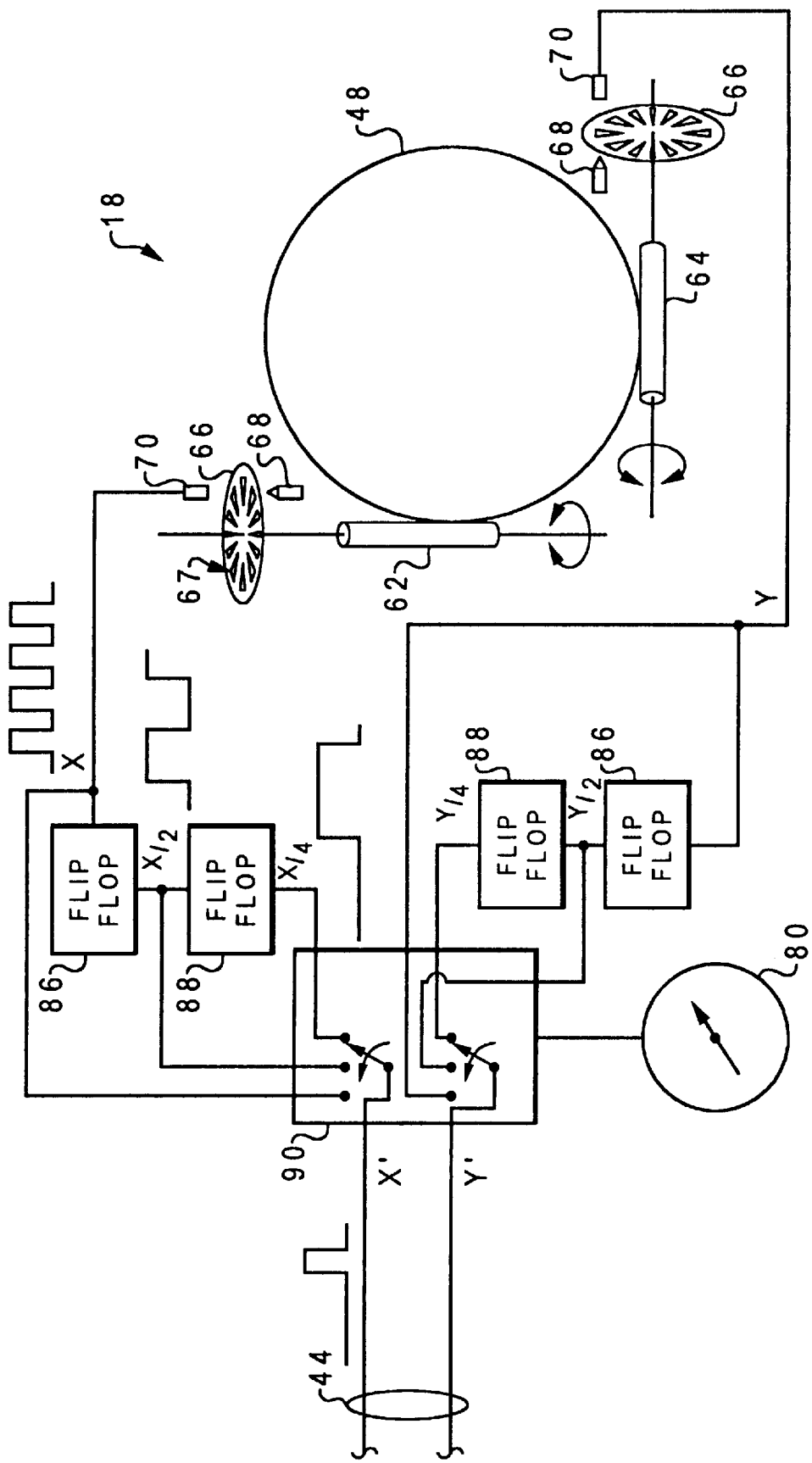
FIG. 7 illustrates a detailed pictorial representation of a third preferred embodiment of a graphical pointing device in accordance with the present invention.

With reference now to FIG. 7, there is illustrated a detailed pictorial representation of a third preferred embodiment of a graphical pointer in accordance with the present invention. Again, as indicated by like reference numerals, mouse 18 illustrated within FIG. 7 comprises an optomechanical mouse similar to those depicted within FIGS. 4 and 6. However, in the third preferred embodiment of the present invention depicted within FIG. 7, the X and Y directional signals generated in response to rotation of ball 48 are each received as an input of one of first flip-flops (bistable multivibrators) 86. As illustrated, the output signal of each first flip-flop 86 includes one-half as many squarewave pulses as the original X or Y directional signal. The output of each of first flip-flops 86 is received as an input by one of second flip-flops 88, which each generate an output signal having one-fourth as many squarewave pulses as the original X or Y directional signal.

Still referring to FIG. 7, mouse 18 further includes three-position switch 90, which selects between the X, X/2, and X/4 directional signals and the Y, Y2, and Y4 directional signals in response to the position of dial control 80. For example, if a user desires a relatively slow graphical pointer speed, the user simply sets dial control 80 to a first position, which causes three-position switch 90 to connect the X' directional signal to the X/4 signal and the Y' directional signal to the Y/4 signal. Alternatively, if the user desires a slightly faster graphical pointer speed, the user sets dial control 80 to a second position at which three-position switch 90 connects the X' directional signal to the X/2 signal and the Y' directional signal to the Y/2 signal. The third preferred embodiment of mouse 18 depicted in FIG. 7 enables a user to control both the speed and sensitivity (i.e., the distance traversed by the graphical pointer within the display device for each incremental manipulation of mouse 18) of a graphical pointer by simultaneously varying the frequency and number of the squarewave pulses within the X' and Y' directional signals. Those skilled in the art will appreciate that additional graphical pointer speed settings can be supported by cascading additional flip-flops within the illustrated circuit.

As has been described, the present invention provides an improved graphical pointing device and method for controlling a graphical pointer within the display device of a data processing system. In particular, the present invention provides a graphical pointer and method for controlling the tracking speed of a graphical pointer utilizing hardware, thereby obviating the need to adjust software settings in order to obtain the desired graphical pointer tracking speed. Although the present invention has been described with reference to preferred embodiments in which the graphical pointing device is a mouse, those skilled in the art will appreciate that the principles disclosed by the present invention may readily be applied to other graphical pointing devices.

While the invention has been particularly shown and described with reference to a preferred embodiment, it will be understood by those skilled in the art that various changes in form and detail may be made therein without departing from the spirit and scope of the invention.

What is claimed is:

1. A graphical pointing device for controlling a graphical pointer displayed within a display device of a data processing system, said graphical pointing device comprising:

a transducer within said graphical pointing device which converts manipulation of said graphical pointing device into electrical signals usable by a data processing system to move a graphical pointer displayed within a display device; and a graphical pointer speed control within said graphical pointing device for varying a relationship between a pulse rate of said electrical signals and a quantum of manipulation of said graphical pointing device, said graphical pointer speed control having a plurality of settings that permit said graphical pointer to be moved within said display device at various speeds in response to a same quantum of manipulation of said graphical pointing device by selecting differing ones of said plurality of settings, wherein a particular setting among said plurality of settings prevents transmission of pulses from said graphical pointing device to said data processing system such that said graphical pointer is held stationary within said display device regardless of manipulation of said graphical pointing device while said graphical pointer speed control is set to said particular setting.

2. The graphical pointing device of claim 1, said graphical pointing device further comprising a ball, coupled to said transducers, that rotates in response to manipulation of said graphical pointing device.

3. The graphical pointing device of claim 1, wherein said graphical pointing device comprises a mouse.

4. A data processing system, comprising:

a processing unit for processing data and instructions, said processing unit being connectable to a display device; and a graphical pointing device for inputting information into said processing unit, said graphical pointing device including:

a transducer within said graphical pointing device which converts manipulation of said graphical pointing device into electrical signals usable by said processing unit to move a graphical pointer displayed within the display device; and a graphical pointer speed control within said graphical pointing device for varying a relationship between a pulse rate of said electrical signals and a quantum of manipulation of said graphical pointing device, said graphical pointer speed control having a plurality of settings that permit said graphical pointer to be moved within the display device at various speeds in response to a same quantum of manipulation of said graphical pointing device by selecting differing ones of said plurality of settings, wherein a particular setting among said plurality of settings prevents transmission of pulses from said graphical pointing device to said data processing system such that said graphical pointer is held stationary within said display device regardless of manipulation of said graphical pointing device while said graphical pointer speed control is set to said particular setting.

5. The data processing system of claim 4, said graphical pointing device further comprising a ball, coupled to said transducer, which rotates in response to manipulation of said graphical pointing device.

6. The data processing system of claim 4, wherein said graphical pointing device comprises a mouse.

7. The data processing system of claim 4, and further comprising a display device.

8. A method for controlling a graphical pointer displayed within a display device of a data processing system, said data processing system having a graphical pointing device including a transducer which converts manipulation of said graphical pointing device into electrical signals utilized by said data processing system to move said graphical pointer, wherein said graphical pointing device further includes a graphical pointer speed control having a plurality of settings, said method comprising:

in response to manipulation of the graphical pointing device, generating one or more electrical signals having a pulse rate;

if said graphical pointer speed control is set to a particular setting among said plurality of settings, preventing transmission of pulses from said graphical pointing device to said data processing system such that said graphical pointer is held stationary within said display device regardless of manipulation of said graphical pointing device; and if said graphical pointer speed control is set to one of said plurality of settings other than said particular setting, adjusting a relationship between a pulse rate of said electrical signals and a quantum of manipulation of said graphical pointing device in accordance with the setting.

* * * * *